June 5, 1928. 1,672,542
H. ROHRDANZ
FILM CUTTING AND JOINING DEVICE
Filed Aug. 11, 1925 2 Sheets-Sheet 1
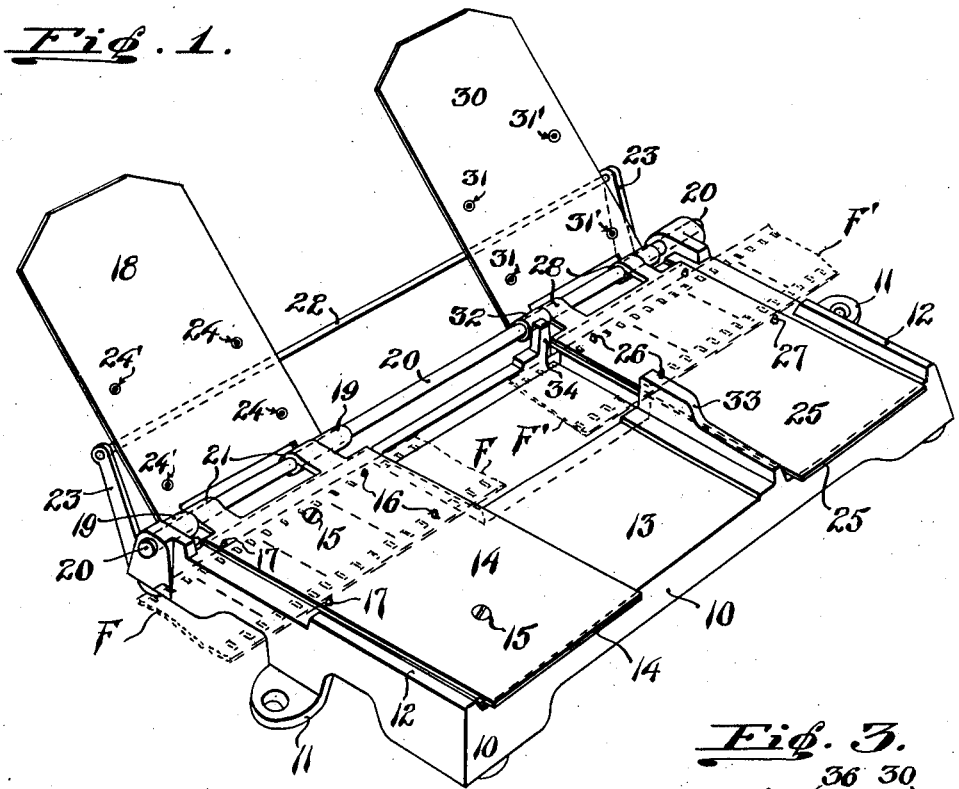
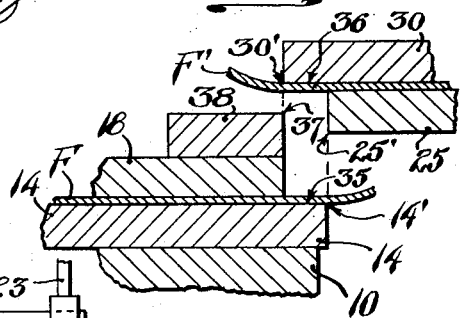
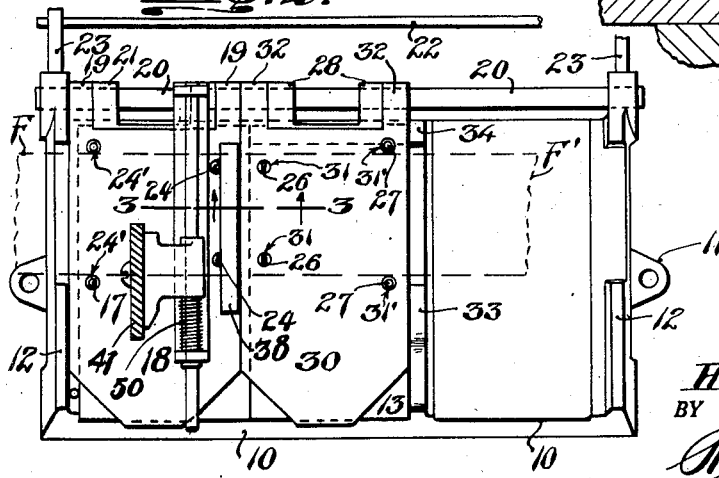
INVENTOR.
Harold Rohrdanz;
BY
ATTORNEY

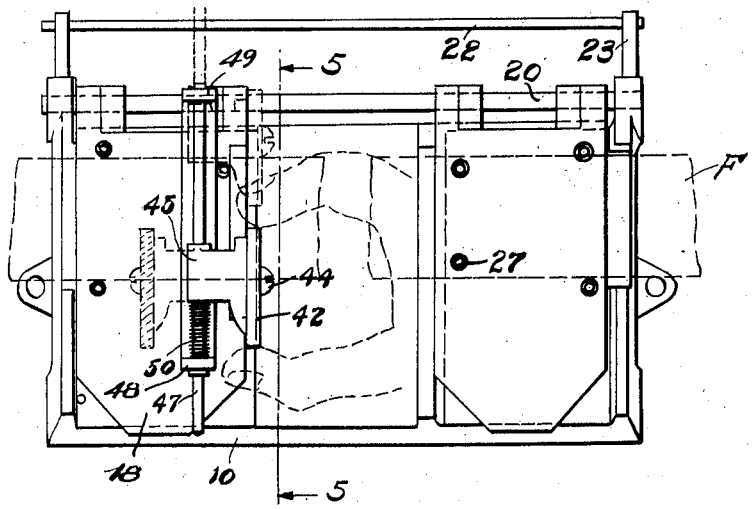
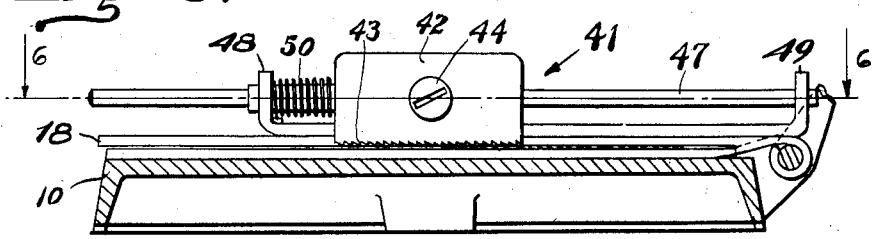
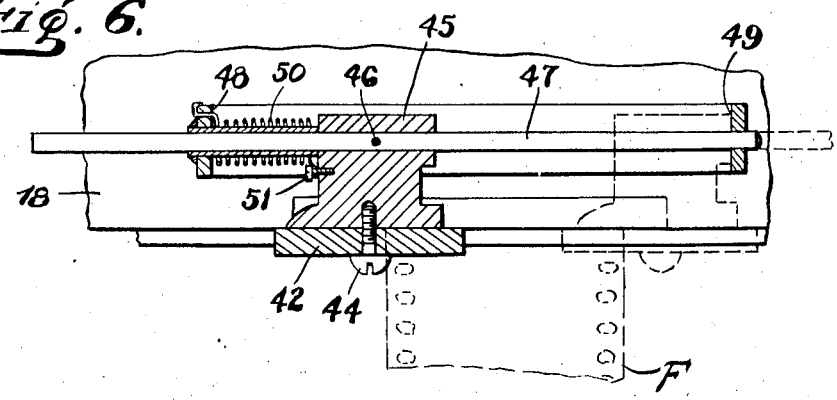

Patented June 5, 1928.

1,672,542

UNITED STATES PATENT OFFICE.

HAROLD ROHRDANZ, OF INGLEWOOD, CALIFORNIA.

FILM CUTTING AND JOINING DEVICE.

Application filed August 11, 1925. Serial No. 49,656.

This invention relates to means for trimming and joining strips of film either for originally assembling film or for subsequently patching the same.

An object of the invention is to provide a film-splicing device which will insure perfect spacing of the film in two joined film sections; whereby the film may be run through a projecting machine without requiring adjustment after the joint passes through.

Another object is to provide in such a device means which will receive and retain two film-ends whereby the same may be presented in properly spaced and aligned position for trimming and which will enable said ends to be separated for abrasion of their surfaces and application of cement thereto, and then to be moved readily to position where they will automatically assume their original relation of perfect spacing and alignment for performance of the joining operation.

A further object is to provide a device of the above character including a manually operable means for effecting abrasion of the portion of a film section to be overlappel and adhered to another film section.

The invention resides in the novel arrangement and combination of parts and features of construction disclosed in the accompanying drawings, described hereinafter and pointed out in the appended claims, it being understood that the invention is limited only as defined by said claims.

Briefly, the invention comprises two relatively movable holders adapted to receive film ends, said holders having guiding and positioning means whereby the images on the film may be properly spaced and aligned, each holder including means for engaging and holding the film ends in position. One of said holders preferably is stationary. The other holder, which is movable in the direction of the length of the film and also perpendicularly thereof, initially is spaced from the stationary holder for receiving the film, and is adapted then to be lifted and moved in the direction of the length of the film toward the stationary holder whence it may be swung into guided position alongside said stationary holder for trimming off the waste ends of the film sections. The movable holder may then be withdrawn for abrading the overlapped ends of film and for application of cement thereto, whereupon it will be returned to guided position alongside the stationary holder for the joining operation; means being provided on the stationary holder operable to effect abrasion of the film section retained therein.

In the drawings wherein certain embodiments of the invention are disclosed by way of illustration:

Fig. 1 is a perspective view of the film splicer showing the hinged film engaging leaves or plates in elevated position ready for reception of film ends on the lower plates of the holders;

Fig. 2 is a plan view showing the leaves lowered into operative position;

Fig. 3 is a cross sectional detail taken on the line 3—3 of Figure 2;

Fig. 4 is a plan view showing the parts as positioned in effecting abrasion of one side of the film section;

Fig. 5 is a view in section and elevation as seen on the line 5—5 of Fig. 4 illustrating the abrading device;

Fig. 6 is a horizontal section as seen on the line 6—6 of Fig. 5.

In the embodiment here disclosed, a base 10 is provided which is equipped with ears 11 for the purpose of securing the device upon a bench or the like, the ends of the base having transversely disposed flanges 12 between which there is thus provided a depressed work table 13. At the left end of the device as shown, a stationary holder is provided which comprises a plate 14 secured to the table 13, as by means of screws 15. This plate is equipped at one side with a pair of pins or projections 16 adapted to enter the apertures provided adjacent the edges of motion picture film, while at the opposite side of said plate 14 a second pair of pins 17 is provided which are so spaced as to engage the edges of a strip of film such as indicated at F. For the purpose of retaining the strip F of film upon the plate 14 a hinged plate or leaf 18 is provided having hinging ears 19 disposed about a rod or pintle 20, said ears 19 being positioned on the rod 20 by reason of engagement with suitable positioning means, such as ears 21 which may be carried on the stationary plate 14. When in inoperative position, the hinged leaf 18 is adapted to lean back against a supporting bar 22 carried upon brackets 23 provided at the back of the base 10. When the leaf 18 is swung into film-engaging position as indicated in Figure 2 the positioning pins 16 and 17 enter apertures 24 and 24' in said leaf 18 thereby permitting firm engagement of the film by said leaf.

At the opposite end of the base 10 a holder is provided which is movable toward and from the stationary holder, said movable holder comprising a plate 25 having a pair of projecting pins 26 adapted to enter the apertures at the sides of the strip F′ of film, said plate 25 also having a pair of projections 27 spaced to engage the edges of said strip F′, the pairs of projections 26 and 27 corresponding with the projections 16 and 17 on the plate 18. The plate 25 is hinged on the rod 20 by means of ears 28 which are adapted to slide along said rod 20. In initial position, the plate 25 is disposed at the extreme right of the base 10 and is there spaced from the plate 14 a distance approximately equal to the width of said plate 25. When the strip F′ is positioned on the plate 25 it is retained by means of a hinged leaf or plate 30 having apertures 31 and 31′ adapted to receive the projections 26 and 27 respectively, said leaf 30 being hinged on the rod 20 by means of ears 32 which permit it to be swung down into engagement with plate 25 and also to be moved longitudinally of the rod 20 toward and from the stationary holder. The leaf 30 also is supported by the bar 22 when in the inoperative position indicated in Fig. 1.

When the strip F of film has been placed in operative position on the plate 14 and leaf 18 has been moved into operative position as indicated in Fig. 2, and when the strip F′ of film has been placed on the plate 25 and the leaf 30 has been swung down into engagement therewith, the movable holder formed by the plate 25 and leaf 30 will be elevated sufficiently to free a pair of guides 33 and 34 and will then be moved to the left toward the stationary holder 14. When brought into this position the movable holder will be swung down into a position alongside the stationary holder as seen in Figure 2 and will there be guided into trimming position by means of the guides 33 and 34 which are transversely disposed on work table 13, said guides being so positioned as to insure proper trimming engagement between the parts.

The trimming operation is performed by cutting edges provided on the parts of the holders. Referring to Figure 3 particularly, it will be noted that the swinging leaf 18 of the stationary holder is somewhat narrower than the base plate 14 thus providing a ledge 35 as a part of the plate 14, while the hinged leaf 30 of the movable holder is somewhat wider than the plate 25 thereof thereby forming a ledge 36 as a part of the leaf 30, which ledge 36 overhangs ledge 35. The right edge 14′ of the stationary plate 14 is formed as a cutting edge which cooperates with a cutting edge 25′ on the plate 25, while the left edge of the hinged leaf 30 of the movable holder is provided with a cutting edge 30′ which cooperates with a cutting edge 37 carried by a strip 38 secured on the upper side of the hinged leaf 18. Thus, when the movable holder formed by the plate 25 and leaf 30 is swung down into position alongside the stationary holder the waste ends of the film strips F and F′ will be sheared by the cutting edges above described, proper shearing action being insured by engagement of the parts of the movable holder with the guides 33 and 34, and by engagement of the projections 16, 17, 26 and 27 in the apertures 24, 24′, 31 and 31′. The table 13 may be pocketed at 40 to receive the trimmings.

When the shearing operation is completed the two film strips F and F′ are properly aligned for a joint-forming operation. Inasmuch as the movements of the movable holder 25, 30 are guided by the rod or pintle 20, said holder may be lifted to separate the overlapped parts of the film sections for the purpose of abrading the same and for application of cement thereto without disturbing the conditions of alignment. The movable holder and its film section F′ is then moved to its initial position and spaced from the stationary holder as shown in Fig. 4 thus exposing the end margin of the film section F on the ledge 35 to permit abrading the upper surface thereof. Abrasion of the film section is effected by means of an abrading tool 41 embodying a plate 42 having a serrated or toothed lower edge 43 affording a rasped surface, which plate is secured by a screw 44 to a bracket 45 affixed by a pin 46 to a longitudinally slidable guide rod 47 supported in bearings 48 and 49 carried by the swinging leaf 18; the guide rod 47 extending parallel to the cutting edge 37 on the leaf 18 and spaced rearwardly therefrom. The rod 47 is turnable on its bearings and the bracket 45 is of such length that the plate 42 may be positioned to extend alongside the edge of the leaf 18 with the rasped surface 43 thereon disposed to engage the upper surface of the film section F so that on manually reciprocating the plate 42 the film section will be subjected to an abrading action. Wound on the rod 47 is a coil spring 50 one end of which is secured to the rod-bearing 48 and the other end of which is attached by a screw 51 to the bracket 45. This spring exerts both a torsional and longitudinal pull on the rod 47 and operates to normally maintain the bracket 45 in a retracted position and in a position extending away from the cutting edge of the plate 18, as shown in Fig. 2 so that the abrading device will normally be disposed out of its operative position clear of the edge of the swinging leaf 18 to permit the ready positioning of the film section F in the stationary holder and the accomplishment of the cutting action as before described. The spring 50, however, permits manual swinging of the bracket 45 to its operative position and also allows reciprocation of the stem 47 in operating the abrading device and during reciprocation of the abrading device in working the surface of the film acts to assist in retracting the abrading device. After thus abrading the film the abrading device is automatically restored to its normal position shown in Fig. 2 by the spring 50. The movable holder and its film section F' may then be returned to the position indicated in Figure 2, said movable holder being guided by the parts 33 and 34 into the position occupied during the trimming operation and the overlapped portions of the film sections being pressed together between the ledges 35 and 36 for the formation of the joint.

Inasmuch as the images on the two sections F and F' of film may be properly spaced by reason of the projections 16 and 26, an alignment of the two sections is determined by means of the projections 17 and 27, this relation will be maintained throughout all the operations of the device so that the resulting joint will secure the sections of film in perfect alignment with the images properly spaced as in a single length of film.

I claim:—

1. In a film splicer, a hinged leaf, means whereby a film section may be clamped by said leaf with the end portion thereof projecting beyond one edge of the leaf, a guide bar mounted for turnable and longitudinal movement on said leaf, and an abrading device carried by said bar adapted to be positioned to engage the surface of the film section projecting beyond the edge of the leaf, and a spring acting on said abrading device to normally hold it both longitudinally and laterally from the edge and end, respectively of the clamped film section.

2. In a film splicer, a plate adapted to support a film section, a hinged leaf adapted to clamp said film section while the latter is supported upon said plate, the width of said plate being sufficient to provide a ledge whereon a portion of the film section may be exposed when clamped by said leaf, an abrading device adapted to abrade the exposed portion of the film under the above-recited condition, a guide carried by said plate, said abrading device being mounted upon said guide to have thereon a sliding and also a rocking or turning movement, and a spiral spring which tends both to retract said abrading device and to rock it out of engagement with the exposed portion of the film when the latter is clamped between said plate and leaf.

In testimony whereof I have affixed my signature.

HAROLD ROHRDANZ.